3,663,473
PRECIPITATION METHOD OF PREPARING ALKALINE-EARTH METAL FLUORO-CHLORO PHOSPHATE PHOSPHOR

Joseph W. Sausville, Glen Rock, N.J., assignor to Westinghouse Electric Corporation, Pittsburgh, Pa.
No Drawing. Filed Nov. 6, 1970, Ser. No. 87,578
Int. Cl. C09k 1/36
U.S. Cl. 252—301.6 P   5 Claims

ABSTRACT OF THE DISCLOSURE

An improved method of preparing alkaline-earth metal fluoro-chloro-phosphate phosphor is detailed, wherein metal activator doped alkaline-earth metal fluoro-apatite is precipitated from solution and thereafter fired to incorporate chlorine into the phosphor matrix and optimize the luminescence of the resulting halophosphate phosphor. An aqueous solution essentially containing as reactive constituents predetermined amounts of alkaline-earth metal, phosphate radical, fluorine and antimony is prepared with a pH value of less than about 4.5. The aqueous solution is maintained at a temperature greater than about 65° C., whereby apatite-structured alkaline-earth metal fluorophosphate is formed. A predetermined amount of selected basic compound is added to the solution to adjust the pH value to from about 6 to 8.5. A soluble chlorine containing compound is included in the solution, either prior to or after the pH is raised, as well as soluble compounds of any additional metal activator constituents, and the solution is digested. The resultant activator doped fluoroapatite is then separated from solution, and after drying is fired to incorporate chlorine into the phosphor matrix and optimize the luminescence of the phosphor.

BACKGROUND OF THE INVENTION

The halophosphate phosphor family remains the most important commercially useful group of phosphors. The manganese and antimony activated calcium fluoro-chloroapatite with or without supplementation by cadmium is the standard fluorescent lamp phosphor presently used. This phosphor is typically prepared by a solid state firing of the raw mix constituents, wherein the apatite structure phosphor is formed in a very high firing temperature. In copending application Ser. No. 71,204 filed Sept. 10, 1970, and copending application Ser. No. 109,988, filed Jan. 26, 1971. Each owned by the assignee of the present application, are disclosed methods of preparing halophosphate phosphors by precipitation from aqueous solution.

SUMMARY OF THE INVENTION

A method is disclosed whereby activator metal can be readily incorporated into a precipitated fluoro-apatite while these constituents are disposed in the precipitating solution. The alkaline-earth metal fluoro-apatite is formed first by mixing predetermined amounts of aqueous solutions containing as essential reactive constituents, predetermined amounts of alkaline-earth metal ions, phosphate radical, fluorine ions, and antimony ions. The phosphate radical ions are present in such amount with respect to the alkaline-earth metal ions as to provide at least a slight excess over that amount required to form alkaline-earth metal fluoro-apatite. The fluorine ions are present in an amount with respect to the alkaline-earth metal ions as required to form alkaline-earth metal fluoro-apatite. The admixed solution has a pH of less than about 4.5, and is maintained at a temperature of at least 65° C. to digest the mixture and precipitate antimony-containing alkaline-earth metal fluoro-apatite. The pH of the solution containing the dispersed fluoro-apatite is then raised to a value of from about 6 to 8.5 by the addition of a selected basic compound. If sufficient chlorine is not already present in solution, such as having been provided by utilizing alkaline-earth metal chloride to provide the alkaline-earth metal ions, additional readily soluble chloride is added to the solution to precipitate chloride with the already precipitated fluoro-apatite. While the antimony is included in the initial solutions in an activating proportion, manganese and cadmium, if desired in the final phosphor, are added to the solution after the pH is raised to from 6 to 8.5, and the solution digested to effect incorporation of the manganese and cadmium with the precipitate. The precipitate is then separated from the residual solution by, for example, filtration, washed and dried, and fired in a conventional furnace at a temperature and for a time sufficient to form the fluoro-chloro-apatite and optimize the luminescence of the resulting alkaline-earth metal halophosphate phosphor.

DESCRIPTION OF THE PREFERRED EMBODIMENT

The invention can be best understood by reference to a description of an exemplary embodiment of the practice of the method. Calcium is conveniently provided in the solution by dissolving, for example, 280 grams of calcium chloride in a mixture of 48 milliliters of glacial acetic acid and about 4000 milliliters of distilled water. The phosphate radical and fluoride are conveniently provided in solution by dissolving about 240 grams of diammonium phosphate $(NH_4)_2HPO_4$, and 13.6 grams of ammonium fluoride in a mixture of 48 milliliters of glacial acetic acid and 1200 milliliters of distilled water. The calcium containing solution and the phosphate radical and fluoride containing solution are each heated to about 75° C. and admixed, for example being totally admixed in about a 20 minute period. Also added to this aqueous acidic solution is an amount of antimony oxide dissolved in aqueous ammonium fluoride, for example about 50 ml. of a solution which is about 0.28 molar with respect to antimony, and about 1.08 molar with respect to ammonium fluoride. The resulting mixture is an aqueous solution with a pH of about 3 which is stirred and digested for one hour at about 70° C. The precipitate at this stage consists of antimony doped calcium fluoro-apatite, which is commonly expressed as $3Ca_3(PO_4)_2$—$CaF_2$, wherein a form of antimony replaces a portion of the calcium. The precipitate will remain suspended in solution as the solution is stirred. Sufficient concentrated ammonium hydroxide is then added to the solution to raise the pH to about 6.5. The manganese and cadmium constituents are then added to the solution, for example, by first dissolving about 6.45 grams of manganese chloride, 5.113 grams of cadmium chloride, and about 1.4 grams of ammonium chloride in about 400 milliliters of distilled water. The manganese and cadmium containing solution is then admixed with the precipitate containing solution. The resultant solution is digested at about 75° C., and after about one hour of stirring, the precipitate is filtered and washed in distilled water, and dried. The resultant precipitate is an antimony, manganese, and cadmium doped calcium fluoro-apatite with admixed precipitated chloride. The precipitate is then fired at from about 1000–1250° C., and preferably at 1200° C., for a time sufficient to incorporate chlorine into the phosphor matrix and optimize the luminescence of the resultant phosphor, for example about three hours. The firing is conducted in a conventional furnace used in halophosphate production.

It has been discovered that by controlling the value to which the pH of the fluoro-apatite precipitate containing solution is adjusted, by the addition of the basic compound such as ammonium hydroxide, it is possible to control the efficiency of incorporation of the metal activator in the final precipitate. For example, when the pH value is adjusted to about 6.5 as described above, the chemical analysis of the separated precipitate shows it to contain about 1.15 weight percent cadmium, 0.88 weight percent manganese, and 0.67 weight percent antimony. An X-ray analysis of the precipitate shows it to have an apatite structure.

When the pH of the precipitate containing solution is adjusted to about 7.5 by increasing the addition of ammonium hydroxide, the incorporation of the constituents is altered so that the precipitate contains 0.75 weight percent cadmium, 0.59 weight percent manganese, and 0.55 weight percent antimony.

It has been discovered that when the pH value of the precipitate solution is adjusted to a pH value of from about 6 to 8.5, it is possible to maintain the manganese ion in the proper valence state to avoid discoloration of the precipitate.

It is readily apparent that other alkaline-earth metals can be substituted for the calcium in practicing this method, as well as other selected metal activator constituents which are known to be efficient activators or dopants with the halophosphate family of phosphors. The particular raw mix constituents described above have been used in the method and other raw mix compositions that will be readily usable will be apparent.

Even though a relatively large amount of chlorine is included in the final solution, it has been found convenient to introduce at least a portion of the alkaline-earth metal as the chloride in the initial solution. At low pH values the chlorine remains in solution as the fluoro-apatite forms.

The antimony is included in the initial precipitating solution since it is more readily incorporated at the low pH, but can also be included with the other activators after the pH is raised. The manganese and cadmium can be added after the pH value is changed when the solution pH is from 6 to 8.5.

I claim as my invention:

1. The method of preparing alkaline-earth metal fluoro-chloro-apatite phosphor activated with antimony or antimony plus manganese, said method comprising the steps of:

(a) mixing a first aqueous solution containing as essential reactive constituents predetermined amounts of alkaline-earth metal ions, and a second aqueous solution containing as essential reactive constituents phosphate radicals and fluorine ions, said phosphate radicals present in such amount with respect to said alkaline-earth metal ions as to provide at least a slight excess over that amount required to form alkaline-earth metal fluoro-apatite, said fluorine ions present in such amount with respect to said alkaline-earth metal ions as required to form alkaline-earth metal fluoro-apatite, said alkaline-earth metal ions preferably being introduced into said first solution at least in part as chloride; and said mixed solutions having a pH of less than about 4.5;

(b) incorporating in said mixed solutions a predetermined amount of antimony ions as desired in said phosphor, with said antimony ions added with said first solution or added to said solutions after mixing;

(c) digesting said mixed solutions at a temperature of at least 65° C. to precipitate alkaline-earth metal fluoro-apatite;

(d) raising the pH of said mixed solutions to from 6 to 8.5 and adding thereto any desired additional metallic activator ions, including manganese, in predetermined amount as desired in said phosphor, with any additional chlorine ions as desired added to said mixed solutions either before or after the pH thereof is raised, and digesting said mixed solutions at a temperature of at least 65° C. to precipitate chloride onto said precipitated alkaline-earth metal fluoro-apatite and to cause said additional metallic activator to be incorported therein; and (e) separating said precipitate from residual mixed solutions, drying same, and firing said precipitate to incorporate chlorine into said phosphor and to optimize the luminescence of the resulting phosphor.

2. The method as specified in claim 1, wherein said first and second aqueous mixed solutions are digested at about 70° C. for about one hour, and at a pH value of about 3 while forming said alkaline-earth metal fluoro-apatite.

3. The method as specified in claim 2, wherein the pH of said mixed solutions is raised to 6.5, and after any desired additional metallic activvator ions are added thereto, said mixed solutions are digested at about 75° C. for about one hour.

4. The method as specified in claim 3, wherein said dried precipitate is fired at from about 1000° C. to 1250° C. for about three hours.

5. The method as specified in claim 1, wherein cadmium is also added to scaid phosphor, and said cadmium is added as cadmium ions with said manganese ions.

References Cited
UNITED STATES PATENTS

| | | | |
|---|---|---|---|
| 3,538,014 | 11/1970 | Wachtel | 252—301.4 P |
| 3,575,876 | 4/1971 | Piper | 252—301.4 P |
| 3,575,877 | 4/1971 | Bertsch | 252—301.4 P |

ROBERT D. EDMONDS, Primary Examiner

U.S. Cl. X.R.

252—301.4 P